Sept. 22, 1925.
E. G. SMITH
1,554,531
CAR TRANSMISSION FOR GENERATORS
Filed March 31, 1923
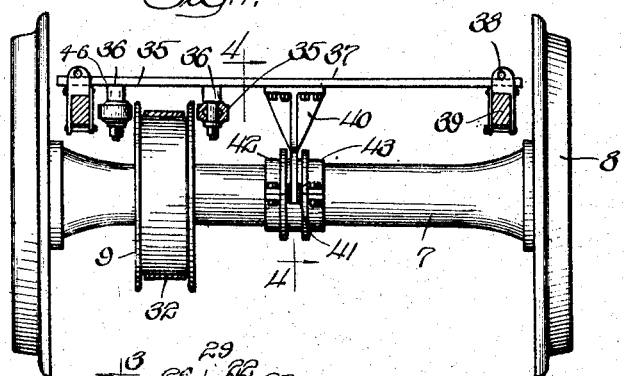
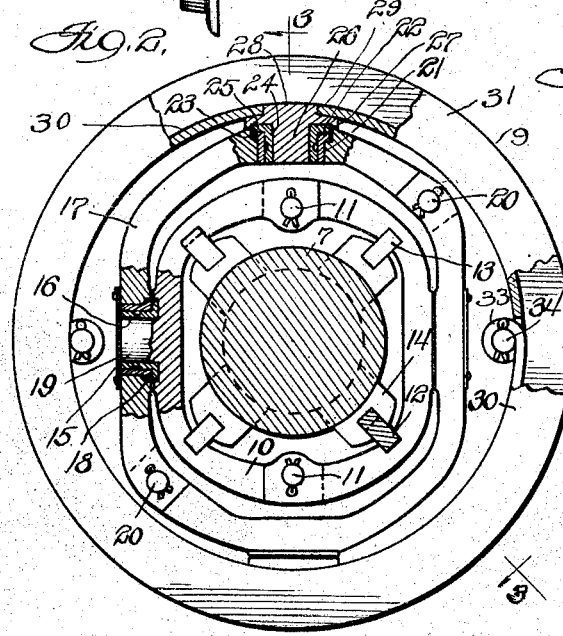
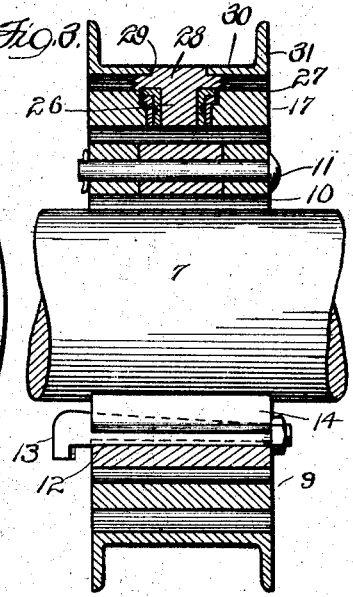
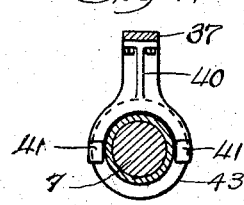
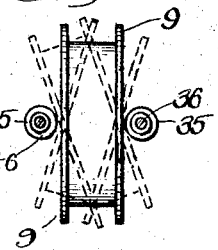
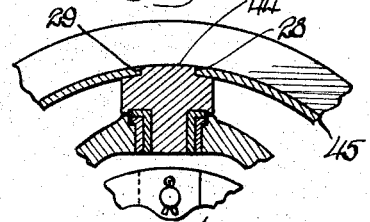
Inventor:
Eugene G. Smith
By Glenn S. Noble  Atty.

Patented Sept. 22, 1925.

1,554,531

UNITED STATES PATENT OFFICE.

EUGENE G. SMITH, OF CHICAGO, ILLINOIS, ASSIGNOR OF ONE PER CENT TO GLENN S. NOBLE, OF CHICAGO, ILLINOIS.

CAR TRANSMISSION FOR GENERATORS.

Application filed March 31, 1923. Serial No. 629,096.

*To all whom it may concern:*

Be it known that I, EUGENE G. SMITH, a citizen of the United States, residing at Chicago, in the county of Cook and State of Illinois, have invented certain new and useful Improvements in Car Transmissions for Generators, of which the following is a specification.

In accordance with the more or less common practice at the present time the lighting systems of railway cars are provided with electricity generated by means of a dynamo mounted underneath the car on the body of the same. These generators are driven by means of belts which pass over pulleys on the generators and driving pulleys on the car axles. On account of the relative movement of the car truck with respect to the body, the driving pulley is often out of alignment with the driven pulley as when the car is passing around a curve. For this reason the driving belts are apt to become stretched and are also apt to be worn along the edges thereby causing the belts to deteriorate very rapidly and furthermore the belts are often thrown off from the pulleys so that the generation of electricity will be stopped.

The present invention relates to improvements in such power transmission and more particularly to the provision of a universal driving pulley and to certain details of construction thereof as well as to means for properly guiding or controlling such pulleys.

The objects of this invention are to provide an improved axle transmission for railway cars which will tend to prevent injury to the driving belts and prolong the life thereof; to provide a transmisson of this character in which the driving and driven pulleys are maintained in proper relation so that the driving belts are not apt to be thrown off from said pulleys, to provide a novel form of universal driving pulley; to provide means for guiding said pulley; and in general to provide such an improved apparatus as will be described more fully hereinafter.

In the acompanying drawings illustrating a preferred form of this invention;

Figure 1 is a front view of a car truck showing the universal pulley and guiding means, parts being broken away for convenience in illustration;

Figure 2 is an enlarged side view of the driving pulley, parts being broken away to show the inner construction;

Figure 3 is a sectional view taken on the line 3—3 of Figure 2;

Figure 4 is a sectional view taken on the line 4—4 of Figure 1;

Figure 5 is a plan view of the driving pulley and guide wheels; and

Figure 6 is a detail of a portion of the driving pulley showing an arrangement for accommodating different sized rims.

The car axle 7 as shown in these drawings may be of any standard or preferred form of construction and is provided with the usual wheels 8. Instead of the usual fixed driving pulley, I provide a universal pulley 9 which is mounted on the axle 7. The inner portion of this pulley comprises a split band 10 which surrounds the axle 7. The ends of this band are arranged to form a joint and are connected by means of pins or pintles 11. This band as well as the other portions of the pulley are split in order that they may be conveniently assembled on the axle. The band 10 has a number of key ways 12 for the keys 13 which keys coact with locking shoes or plates 14 which engage directly with the axle. The faces of the shoes 14 are preferably made concave in order to engage closely with the axle. These shoes are also made in different sizes so that the same band may be used with different axles. For instance, as shown in dotted lines in Figure 2, one of the shoes is illustrated as projecting further toward the center in order to engage with the smaller axle as shown in dotted lines. The band 10 is provided with two diametrically opposed trunnions 15 having bushings 16 fitting over the same, these bushings being preferably made of manganese steel. A split ring 17 which is somewhat similar in construction to the band 10 is positioned over this band and is provided with bushings 18 which fit over the bushings 16 so that the ring 17 may swing or oscillate with respect to the band. The joint thus formed between this band and ring is preferably covered by means of a plate 19 to protect the same against dust or dirt. The ends of the ring 17 are held together by means of pins 20. This ring has two diametrically opposed holes 21 for receiving the bushings 22, these bushings having outwardly projecting flanges 23 for holding them in position. The bushings 22 are engaged by bushings 24 which also have outwardly projecting flanges 25 which fit over the flanges 23. It will be noted that for convenience in construction these bushings are made substantially the same as the bushings 16 and 18. A replaceable trunnion or bearing member 26 fits in the bushing 24 and has an outwardly extending flange 27 which fits over the flange 25 and is recessed to receive the same so that two bushings 21 and 24 are enclosed in a chamber formed by the opening between the ring 17 and the trunnion or bearing 26 and are further covered by short sleeves 47. This will protect these bushings against dirt or moisture and as the rotation or movement of the respective parts is between these bushings the bearing surfaces will be fully protected. The trunnions 26 have outwardly extending stems or projections 28 which fit in holes 29 in a rim 30, this rim being provided with flanges 31 and forms the pulley proper or the portion which is engaged by the belt 32. The rim 30 is also split and eyes 33 are formed therein at the ends for engagement by the pins 34 for holding the two sections together.

It will be seen from this description that as the trunnions or bearings between the band or inner member 10 and the ring or intermediate member 17, and the trunnions between the ring 17 and the rim or pulley 30 are arranged at substantially right angles to each other, the pulley 30 is mounted for universal movement on the axle 7. For this reason it may swing or oscillate in order to follow the direction of the belt 32 as the car axle swings or changes its position with respect to the axis of the generator.

In order to hold the pulley in substantially vertical position, I provide guide rollers 35 which are mounted on pins or bearings 36 on a cross bar 37. This bar is held by means of bearings 38 on the beams 39 of the truck but may slide freely in these bearings. An arm or yoke 40 is secured to the bar 37 and projects down, over or adjacent to the axle 7. The ends of the yoke are preferably protected on each side by plates or pads 41 of manganese steel, these plates being adapted to be engaged by collars 42 and 43 on the axle 7.

If the truck frames were held in substantially fixed position laterally with respect to the wheels and axles the guide wheels 35 might be mounted directly on such frames. However, I have found that in actual practice there is considerable lateral play between the wheels and the truck frames, such play amounting to about two inches on either side of the car before the car is condemned or repairs required. For this reason it is desirable to control or guide the universal pulley 9 more or less directly from the axle and the above described arrangement forms a convenient method for doing so.

The modification shown in Figure 6 illustrates the ease with which the construction is adapted for different sized pulleys as in this case the trunnions or bearings 44 are merely extended to receive the larger sized rim 45 and all of the other parts may be utilized without change.

I have found from actual experience that my improved device not only serves in a large measure to prevent the possibility of throwing off the belts but also increases the life of the belts as they are not apt to become stretched or to have their edges injured by contact with the flanges of the driving pulley as is common with the ordinary fixed driving pulleys. It will also be noted that the arrangement for guiding the universal pulley prevents the pounding or the striking of the guide wheels on the sides of the pulley as would be apt to occur if they were secured directly to the truck frames. The device is also readily applicable to various sizes of car axles and may be readily applied to the car trucks and removed therefrom. Furthermore as the various parts may be made in duplicate a pulley may often be repaired in case of injury by merely replacing an injured part instead of requiring the replacement of an entire pulley as is necessary with the ordinary solid construction. These pulleys may be modified or changed in form in order to adapt them for different conditions and therfore I do not wish to be limited to the exact arrangement or construction herein shown and described except as specified in the following claims in which I claim:

1. In an axle transmission the combination with a car axle, of a pulley mounted for universal movement thereon, a transversely movable supporting member mounted on the truck adjacent to the axle, guides secured to said member and engaging with the pulley and means for connecting the supporting member with the axle whereby the supporting member will be held in substantially fixed position with respect to the axle.

2. The combination with a railway car, of a pulley mounted for universal movement on one of the axles, guides for holding said pulley in vertical position and means for operatively connecting the guides with the axle to hold the guides against lateral movement with respect to the axle.

3. The combination with a railway car, of a universal pulley mounted on one of the axles, guides for holding said pulley in vertical position while permitting it to swing in alignment with the belt, means for supporting said guides, and means coacting with the axle and wheels whereby the guides will partake of the lateral movement thereof.

4. In a car axle transmission, the combination with a car truck, of a universal pulley mounted on one of the axles, a cross bar, bearings on the truck frame for said bar to permit lateral movement thereof, guide rollers on said bar engaging with the opposite sides of the pulley, an arm connected with said bar and means on said axle for engagement with the arm to cause the arm and cross bar to move laterally with the axle.

5. In a transmission for generators, the combination with a truck, of a universal pulley mounted on one of the truck axles, collars arranged on said axle, a fork engaging with said collars, a cross bar secured to said fork, bearings on the truck frame for said bar to permit lateral movement thereof, and guide rollers mounted on said bar and engaging with the opposite sides of the pulley.

6. The combination with a car axle, of a universal pulley, comprising a split band, means for connecting the ends of the band together, tapered keys engaging with keyways in said band, blocks engaging with said keys and adapted to engage with the axle, said band having oppositely disposed trunnions, bushings on said trunnions, a split ring having bushings engaging with the bushings on said trunnions, pins for connecting the ends of the split ring, replaceable trunnion members on said ring, a split pulley rim engaging with said trunnion members and pins for connecting the ends of the pulley rim.

7. In a device of the character set forth, the combination with a railway car axle of a universal pulley comprising a split rim, means for fastening the ends of the rim together, oppositely disposed holes in said rim, replaceable trunnion members engaging with said holes, bushings on said trunnion members, a split ring having bushings engaging with the last named bushings to form a bearing, said bushings having outwardly projecting flanges, the trunnions and ring having annular recesses for receiving said flanges whereby the outer portions of the bushings are enclosed, said ring also having oppositely disposed holes with bushings therein, a band having trunnions with bushings thereon for engagement with the last named bushings, these bushings also having flanged inner ends fitting in recesses in the ring and band, cover plates for the trunnion bearings, and means for securing the band to the axle.

8. In a transmission apparatus, the combination with a car axle of a universal pulley, comprising three annular split members, trunnions between the respective members and means for attaching the inner member to the car axle or the like.

9. The combination with a car axle of a universal pulley of the character set forth comprising an inner annular split member adapted to be secured to the axle, a split intermediate member pivotally mounted on said inner member, an outer split pulley rim and replaceable trunnions between the outer rim and intermediate member whereby rims of different diameters may be used with the same intermediate and inner members.

10. In a transmission apparatus the combination with a car axle of a pulley having a hub fitting over the axle, keyways in said hub, tapered keys engaging with said keyways and blocks fitting on the axle and engaged by said keys for holding the pulley in position.

EUGENE G. SMITH.